Patented Mar. 20, 1934

1,951,718

UNITED STATES PATENT OFFICE 1,951,718

PRODUCTION OF SOLS AND HIGHLY DISPERSED SUSPENSIONS COMPRISING OXYGEN-CONTAINING METAL COMPOUNDS

Walter Ziese, Mannheim, and Kaspar Pfaff, Frankfort-on-the-Main-Hochst, Germany, assignors to I. G. Farbenindustrie Aktiengesellschaft, Frankfort-on-the-Main, Germany No Drawing. Application April 24, 1933, Serial No. 667,690. In Germany March 2, 1931

14 Claims. (Cl. 252—6)

The present invention relates to the production of sols and highly dispersed suspensions containing oxidic metal compounds.

It is already known that by the action of ethylene oxide on metal halides, as for example heavy metal halides or aluminium chloride, not only ethylene halogen hydrins but also a precipitate of metal hydroxide is formed.

We have found that sols or highly dispersed suspensions containing oxidic metal compounds are obtained by reacting alkylene oxides on solutions of salts of heavy metals or earth metals and removing the glycol ester formed together with unaltered alkylene oxide from the reaction mixture before substantial formation of an irreversible precipitate sets in.

The interaction of the alkylene oxide with the metal salt is usually carried out at between about zero and about 150° C. and preferably at about room temperature, say at between 15° and 30° C. The metal salts are dissolved in a suitable solvent; water or other aqueous media are preferred for this purpose, but use may also be made of organic solvents, as for example hydroxyl bearing solvents such as ethyl alcohol or glycerol which should preferably contain small amounts of water.

As has been pointed out above, the reaction can be carried out with salts of heavy metals and earth metals. Salts of any of these metals, including the noble metals, may be employed, but the process is of particular importance for the treatment of salts of base metals. The salts of tri- and tetravalent metals, such as iron, aluminium and the other earth metals, chromium, thorium, cerium and zirconium, usually give rise to the formation of metal oxide sols, whereas the salts of divalent metals, as for example copper and zinc are converted as a rule into highly dispersed suspensions of oxygen-containing compounds of the said metals. The metal salts used may contain any acid radical, whether inorganic or organic, which is capable of combining with the alkylene oxide with the formation of a glycol ester. Basic salts or mixtures of several salts may also be used as initial materials. Particularly good results are obtained with the metal chlorides and bromides, because these are as a rule readily soluble and because they readily form halogen hydrins of the glycols. The salt solutions employed may have any desired concentration. The use of concentrated solutions has the advantage that highly concentrated sols or suspensions are obtained, such as can be produced only with difficulty, if at all, by other methods.

The alkylene oxides used must be soluble at least to a slight extent in the solvent which is used for the reaction. Therefore, when working in aqueous media, mainly the alkylene oxides with from 2 to 4 carbon atoms will be employed. Alphaolefin oxides particularly come into consideration, since these are readily available industrially.

The removal of the glycol esters formed and of unaltered alkylene oxide may be effected by means of an extraction treatment. For example, the process may be carried out by mixing the solutions of metal halides with ethylene oxide, preferably while employing an amount of the latter in excess of the amount theoretically necessary, the reaction solution being subjected to an extraction treatment with ether or other solvents immiscible with water, such as benzene, chloroform, carbon tetrachloride or ethylene dichloride, after the metal halide has been converted (preferably to the extent of about 90 per cent). In this way the ethylene halogen hydrin formed and the unconverted ethylene oxide are removed while the metal hydroxide remains in the form of a colloidal solution.

Products of the same kind are also obtained when the reaction mixture is freed from the organic compound formed during the reaction and any excess of alkylene oxide present not by an extraction treatment but by distillation of the organic substances, if desired while employing reduced pressure; in this case it is preferable to evaporate to dryness, the solid products obtained being taken up in water or another solvent such as alcohols, if desired. In such distillation, the temperature should as a rule not exceed 150° C. and preferably range at or below about 100° C. When working by distilling off the organic compounds, it is preferable either to work with the theoretical amount or even a still smaller quantity of alkylene oxide because otherwise the colloidal solutions readily solidify to irreversible gels during the distillation. The distillation method has the advantage that, by the omission of the extraction treatment, no organic solvents are employed, the costs of the preparation of the desired products thus being lessened. The esters formed as by-products may be recovered, for example, by fractional condensation of the vaporized constituents during the evaporation.

Generally speaking sols or suspensions are obtained according to this invention in which the metal compounds are present as oxides. In many cases, however, oxychlorides of the metals may be present instead of or in addition to the oxides. Thus, for example, by the action of ethylene oxide or its homologues on cupric chloride in equimolecular amounts, cupric hydroxide is not formed but very finely divided cupric oxychloride. The cupric oxychloride may be separated by extracting the solution with solvents for chlorhydrins and alkylene oxides, which solvents are insoluble or soluble only with difficulty in water, or by evaporating the reaction mixture to dryness with or without the employment of reduced pressure.

A special advantage of the process according to this invention, contrasted with processes already known for the manufacture of cupric oxychloride, consists in the fact that an extremely finely divided, partially colloidal copper oxychloride is obtained which may even be recovered in the form of a dry powder. The said favourable property of the resulting copper oxychloride is still further enhanced by carrying out the process in such a way that, in addition to copper chloride, other metal chlorides are subjected to the action of alkylene oxides. The metal hydroxide sols thus formed in addition to the copper oxychloride act as peptizing agents for the copper oxychloride.

The process may be carried out in practice by allowing the solution of ethylene oxide to flow into aqueous cupric chloride solution or vice versa. The ethylene oxide may also be led in the gaseous form into the aqueous cupric chloride solution.

The process according to this invention is especially suitable for the preparation of colloidal solutions which may serve as initial materials for the production of adsorbents, as for example for ferments, or of catalytically active substances.

The following examples will further illustrate the nature of this invention but the invention is not restricted to these examples. The parts are by volume unless otherwise specified.

*Example 1*

5 parts of a 12.5 per cent solution of crystallized aluminium chloride ($AlCl_3.6H_2O$) are diluted with 45 parts of water; 50 parts of a 30 per cent aqueous solution of ethylene oxide are added and the whole is allowed to stand for 4 hours. The excess of ethylene oxide and the ethylene chlorhydrin formed are extracted with ether; the ether dissolved in the sol is removed by heating. A clear stable aluminium hydroxide sol is obtained.

If separation of solid constituents should take place during standing and before the extraction, there is added to the thoroughly mixed suspension sufficient aluminium chloride solution or another peptizing agent to cause redissolution of the whole, extraction then being effected without delay to avoid further separation.

Stable sols containing both ferric hydroxide and aluminum hydroxide may be prepared in an analogous manner. For this purpose, for example, a mixture of 10 parts of 25 per cent ferric chloride and 5 parts of 12.5 per cent aluminium chloride solution is diluted with water (85 parts) and 100 parts of 30 per cent ethylene oxide are added to the whole. After allowing to stand for 3 hours, the mixture is worked up as already described.

*Example 2*

125 parts of a 25 per cent solution of crystallized aluminium chloride ($AlCl_3.6H_2O$) are mixed with a freshly prepared solution of 60 parts of ethylene oxide in 60 parts of water. At intervals, for the purpose of determining the amount of aluminium chloride still unconverted, a sample of 3 cubic centimetres is withdrawn and shaken once with 30 cubic centimetres of pure ether and titrated for the chlorine ion according to Volhard. As soon as the silver nitrate consumption of the solution extracted with ether amounts to about 10 cubic centimetres of $\frac{1}{10}$ normal silver nitrate solution, which is the case after about 3 hours, the whole solution is extracted with ether. After driving off the ether dissolved in the sol on the waterbath, an aqueous colloidal solution of aluminium hydroxide remains behind which is stable for long periods of time and which contains about 40 grams of $Al_2O_3$ per litre, partly in the form of basic aluminium chloride, and small amounts of a conversion product of ethylene oxide of high boiling point. The solution may be evaporated to dryness on a waterbath, with or without the employment of reduced pressure. The vitreous residue may be readily pulverized and may be redissolved in water again at any time. Sols may be thus obtained containing more than 10 per cent of $Al_2O_3$ and of a more or less viscous consistency.

*Example 3*

280 grams of ethylene oxide in gaseous form are led into 2 litres of a solution of tin tetrachloride containing 0.1 gram of chlorine. The whole is then allowed to stand for 48 hours at room temperature and then extracted exhaustively with carbon tetrachloride. The remaining solution is evaporated to a syrupy consistency. It contains basic tin chloride in addition to colloidal tin dioxide.

*Example 4*

10 litres of a 30 per cent aqueous ethylene oxide are added to a solution of 2.5 kilograms of zirconium chloride in 50 litres of water. The whole is allowed to stand for about 6 hours at 25° C., the decrease in the amount of ionized chlorine being followed by titration according to Volhard. As soon as the content in chlorine has decreased to about 10 per cent of its original value, the reaction solution is extracted with ether.

*Example 5*

240 grams of ethylene oxide are led at 25° C. into 1800 cubic centimetres of a 25 per cent solution of crystallized chromium chloride. The whole is allowed to stand at room temperature for 2 days and then extracted with benzene. The extracted solution is evaporated to dryness on the waterbath, if desired. The dry preparation, containing about 50 per cent of $Cr_2O_3$ in all, may be redissolved at any time, for example, in hot water.

*Example 6*

150 grams of gaseous ethylene oxide are led into 1000 cubic centimetres of a solution of aluminium bromide obtained by dissolving 250 grams of sublimed aluminium bromide in 1000 cubic centimetres of water. As soon as the content of the solution in bromine capable of being titrated has decreased to about 10 per cent of its original value, the whole is extracted with ether.

*Example 7*

10 parts of a solution containing 10 grams of crystallized aluminium sulphate per litre are allowed to stand at room temperature for several days with 10 parts of 30 per cent aqueous ethylene oxide, preferably with an addition of 2 parts of 5 per cent gum arabic solution. A sol is formed containing suspended particles which is extracted with ether without separating the suspended matter.

Example 8

10 grams of ethylene oxide are led at room temperature into 100 cubic centimetres of a 15 per cent thorium chloride solution. The whole is allowed to stand for 48 hours and then extracted with ether. After evaporating the sol, a reversibly soluble thorium dioxide preparation is obtained.

Example 9

85 grams of crystallized copper chloride are dissolved in 340 cubic centimetres of water and while stirring at 20° C. a solution of 50 cubic centimetres of ethylene oxide in 110 cubic centimetres of water is allowed to flow in during the course of an hour. The reaction mixture is allowed to stand at room temperature for about 48 hours. The excess of ethylene oxide and the ethylene chlorhydrin formed are extracted with ether. The resulting product, consisting partly of a sol and partly of a highly dispersed suspension, may be evaporated to dryness in vacuo at temperatures up to 55° C. The resulting solid cupric oxychloride may be made into a paste with water without difficulty and has an extremely fine dispersion and high capacity for forming suspensions.

Example 10

170 grams of crystallized copper chloride are dissolved in 640 cubic centimetres of water, a solution of 40 grams of crystallized aluminium chloride in 120 cubic centimetres of water being added thereto. 125 cubic centimetres of ethylene oxide in 250 cubic centimetres of water are allowed to flow in in the course of an hour. After allowing to stand for 3 days, the product is evaporated to dryness in vacuo at a temperature of from 40° to 50° C. The resulting residue is of extraordinary fineness and dispersion as may be seen when it is brought into contact with water.

Example 11

600 parts of a 25 per cent solution of crystallized aluminium chloride are allowed to stand for about 2 days at 30° C. with 120 parts of 1.2-propylene oxide, or heated therewith for several hours in a closed vessel at from 60° to 100° C. The reaction mixture is then extracted with ether in order to remove propylene chlorhydrin formed and any excess of propylene oxide. A clear colloidal solution of aluminium hydroxide is obtained which contains about 50 grams of $Al_2O_3$ per litre, partly in the form of aluminium oxychloride.

Example 12

500 cubic centimetres of a 20 per cent aqueous solution of zinc chloride have gradually added thereto 90 cubic centimetres of 1.2-propylene oxide while stirring. The sol obtained after allowing to stand for several hours, in which solid particles are still present in a state of fine dispersion, is extracted with ethylene chloride. The finely divided suspended particles may be even more finely dispersed by the addition of an aluminium hydroxide sol obtained, for example according to Example 11.

Example 13

625 cubic centimetres of a 25 per cent solution of crystallized aluminium chloride are mixed with a solution of 95 cubic centimetres of liquid ethylene oxide in 275 cubic centimetres of water and allowed to stand for 24 hours at room temperature. The whole is evaporated in vacuo, while recovering the effluent vapours, until a readily friable dry mass remains. In order to prepare a sol, for example 100 cubic centimetres of water are added to 10 grams of the powder, a mobile solution being formed within a short time. In order to produce an alcoholic sol, 10 grams of the dry powder are shaken for several hours with 100 cubic centimetres of 96 per cent alcohol, undissolved powder then being centrifuged off.

Example 14

600 parts of a 25 per cent solution of crystallized aluminium chloride are allowed to stand for about 2 days at 30° C. with 125 parts of 1.2-propylene oxide, or heated therewith for several hours at from 60° to 100° C. in a closed vessel. The reaction mixture is then evaporated to dryness in vacuo in order to remove the propylene chlorhydrin formed. After taking up the residue in water, a colloidal solution of aluminium oxide is obtained.

Example 15

28 kilograms of an aluminium oxide hydrate containing 20 per cent of water are mixed with 33.7 liters of hydrochloric acid of 1.19 specific gravity and allowed to stand until the reaction is substantially complete. For making a basic aluminium chloride solution, the resulting solution is boiled for 2 hours under a reflux condenser, whereupon the mass is diluted with so much water that a filtered sample when titrated according to Volhard requires per cubic centimetre 18.5 cubic centimetres of decinormal silver nitrate solution. The volume of the solution will then be about 225 litres. 2.75 kilograms of gaseous ethylene oxide are then led into 100 litres of the solution. The ethylene chlorhydrin formed is then distilled off under reduced pressure in the form of a mixture with water, preferably until about 25 litres of the liquid have passed over. Then a further 2.75 kilograms of gaseous ethylene oxide are led in, 25 litres of water are added and ethylene chlorhydrin and water are again distilled off, preferably until about 50 litres of liquid have passed over. A viscous sol is obtained which by further evaporation, preferably in a flat-bottomed vacuum pan, can be dried to a vitreous mass which may be redissolved in water or ethyl alcohol to form a sol.

Example 16

1.1 kilograms of gaseous ethylene oxide are passed at room temperature into 11 litres of a waste aluminium chloride liquor which also contains aluminium sulphate in addition to ferric chloride as an impurity, the said solution containing per litre about 70 grams of $Al_2O_3$, 115 grams of chlorine and not more than 8.25 grams of $SO_4$. The mixture is left standing at room temperature for from 5 to 6 hours and then 5.5 litres of liquid are distilled off at between 50° and 60° C. and under reduced pressure. For removing the ethylene chlorhydrin as completely as possible, 5 litres of water are added to the distillation residue and a further 5 litres of liquid are distilled off under the said conditions. A reddish yellow viscous sol is obtained.

Example 17

3 kilograms of gaseous ethylene oxide are led into 25 litres of a solution of anhydrous aluminium chloride in ethyl alcohol of 96 per cent strength, which when titrated according to Volhard requires per cubic centimetre 33.3 cubic centimetres of decinormal silver nitrate solution. When all ethylene oxide has been introduced, a sample of the liquid requires per cubic centimetre only 7.5 cubic centimetres of decinormal silver nitrate solution. The alcohol is distilled off on a water bath. The dry residue dissolves in water to form a sol.

Example 18

500 grams of epichlorhydrin are added to 2 litres of an aqueous aluminium chloride solution which when titrated according to Volhard requires per cubic centimetres 30 cubic centimetres of decinormal silver nitrate solution. The mixture is heated for 2 hours on a steam bath under a reflux condenser while agitating and then cooled to room temperature. Any unconverted epichlorhydrin which may still be present, is separated in a separating funnel. The glycerol dihydrochlorate formed is extracted from the sol by means of ether.

A solution of anhydrous aluminium chloride in ethyl alcohol may be treated in a similar manner. In this case the organic substances are removed from the sol by distillation.

Example 19

0.5 gram of palladious chloride is dissolved in 25 cubic centimetres of water and 3 grams of gaseous ethylene oxide are led in. The initially yellowish brown solution soon turns dark brown by the formation of a sol, which also contains solid matter in a fine suspension. The organic compounds are removed from the product by repeated extraction with ether.

In the appended claims the term "substantially colloidal preparation comprising an oxygen-containing metal compound" is used to include true colloidal solutions as well as highly dispersed suspensions and also the preparations obtainable on evaporation of the aforesaid colloidal solutions or suspensions.

What we claim is:—

1. The process of producing a substantially colloidal preparation comprising an oxygen-containing compound of a metal, which comprises an alkylene oxide with a solution of a salt of a metal selected from the group consisting of the heavy metals and the earth metals and removing the glycol ester formed together with unaltered alkylene oxide before substantial formation of an irreversible precipitate sets in.

2. The process of producing a substantially colloidal preparation comprising an oxygen-containing compound of a metal, which comprises reacting an alkylene oxide in an aqueous medium with a water-soluble salt of a metal selected from the group consisting of the heavy metals and the earth metals and removing the glycol ester formed together with unaltered alkylene oxide before substantial formation of an irreversible precipitate sets in.

3. The process of producing a substantially colloidal preparation comprising an oxygen-containing compound of a metal, which comprises reacting an alkylene oxide in an aqueous medium with a water-soluble salt of a metal selected from the group consisting of the heavy metals and the earth metals and removing, by extraction with a water-insoluble organic solvent, the glycol ester formed together with unaltered alkylene oxide before substantial formation of an irreversible precipitate sets in.

4. The process of producing a substantially colloidal preparation comprising an oxygen-containing compound of a metal, which comprises reacting an alkylene in an aqueous medium with a water-soluble salt of a metal selected from the group consisting of the heavy metals and the earth metals and removing, by distillation, the glycol ester formed together with unaltered alkylene oxide before substantial formation of an irreversible precipitate sets in.

5. The process of producing a substantially colloidal preparation comprising an oxygen-containing compound of a metal, which comprises reacting ethylene oxide in an aqueous medium with a water-soluble salt of a metal selected from the group consisting of the heavy metals and the earth metals and removing the glycol ester formed together with unaltered ethylene oxide before substantial formation of an irreversible precipitate sets in.

6. The process of producing a substantially colloidal preparation comprising an oxygen-containing compound of a metal, which comprises reacting ethylene oxide in an aqueous medium with a water-soluble halide of a metal selected from the group consisting of the heavy metals and the earth metals and removing the glycol ester formed together with unaltered ethylene oxide before substantial formation of an irreversible precipitate sets in.

7. The process of producing a substantially colloidal preparation comprising an oxygen-containing compound of a metal, which comprises reacting ethylene oxide in an aqueous medium with a water-soluble chloride of a metal selected from the group consisting of the heavy metals and the earth metals and removing the glycol ester formed together with unaltered ethylene oxide before substantial formation of an irreversible precipitate sets in.

8. The process of producing a substantially colloidal preparation comprising an oxygen-containing aluminium compound which comprises reacting an alkylene oxide in an aqueous medium with a water-soluble salt of aluminium and removing the glycol ester formed together with unaltered alkylene oxide before substantial formation of an irreversible precipitate sets in.

9. The process of producing a substantially colloidal preparation comprising an oxygen-containing aluminium compound which comprises reacting ethylene oxide in an aqueous medium with aluminium chloride and removing the glycol ester formed together with unaltered ethylene oxide before substantial formation of an irreversible precipitate sets in.

10. The process of producing a substantially colloidal preparation comprising an oxygen-containing copper compound which comprises reacting an alkylene oxide in an aqueous medium with a water-soluble salt of copper and removing the glycol ester formed together with unaltered alkylene oxide before substantial formation of an irreversible precipitate sets in.

11. The process of producing a substantially colloidal preparation comprising an oxygen-containing copper compound which comprises reacting ethylene oxide in an aqueous medium with copper chloride and removing the glycol ester formed together with unaltered ethylene oxide before substantial formation of an irreversible precipitate sets in.

12. The process of producing a substantially colloidal preparation comprising an oxygen-containing compound of a heavy base metal, which comprises reacting an alkylene oxide in an aqueous medium with a water-soluble salt of a heavy base metal and removing the glycol ester formed together with unaltered alkylene oxide before substantial formation of an irreversible precipitate sets in.

13. The process of producing a substantially colloidal preparation comprising an oxygen-containing compound of a metal, which comprises reacting an alpha-alkylene oxide in an aqueous medium with a water-soluble salt of a metal selected from the group consisting of the heavy metals and the earth metals and removing the glycol ester formed together with unaltered alkylene oxide before substantial formation of an irreversible precipitate sets in.

14. The process of producing a substantially colloidal preparation comprising an oxygen-containing compound of a metal, which comprises reacting an alpha-alkylene oxide containing from 2 to 4 carbon atoms in an aqueous medium with a water-soluble salt of a metal selected from the group consisting of the heavy metals and the earth metals and removing the glycol ester formed together with unaltered alkylene oxide before substantial formation of an irreversible precipitate sets in.

WALTER ZIESE.
KASPAR PFAFF.

CERTIFICATE OF CORRECTION.

Patent No. 1,951,718.                                        March 20, 1934.

WALTER ZIESE, ET AL.

It is hereby certified that error appears in the printed specification of the above numbered patent requiring correction as follows: Page 1, lines 2-3 and 10, for "containing oxidic" read comprising oxygen-containing; page 4, line 81, claim 4, after "alkylene" insert oxide; and that the said Letters Patent should be read with these corrections therein that the same may conform to the record of the case in the Patent Office.

Signed and sealed this 11th day of September, A. D. 1934.

(Seal)

Leslie Frazer
Acting Commissioner of Patents.